US009489183B2

(12) United States Patent
Ringseth (10) Patent No.: US 9,489,183 B2
(45) Date of Patent: Nov. 8, 2016

(54) TILE COMMUNICATION OPERATOR

(75) Inventor: Paul F. Ringseth, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 12/902,404

(22) Filed: Oct. 12, 2010

(65) Prior Publication Data

US 2012/0089961 A1    Apr. 12, 2012

(51) Int. Cl.
*G06F 9/44*    (2006.01)
*G06F 9/45*    (2006.01)

(52) U.S. Cl.
CPC .............. *G06F 8/453* (2013.01); *G06F 8/314* (2013.01)

(58) Field of Classification Search
CPC ...................................... G06F 8/314
See application file for complete search history.

(56) References Cited

U.S. PATENT DOCUMENTS

| | | | |
|---|---|---|---|
| 4,156,910 A | 5/1979 | Barton et al. | |
| 5,179,702 A | 1/1993 | Spix et al. | |
| 5,551,039 A | 8/1996 | Weinberg et al. | |
| 5,710,927 A | 1/1998 | Robison | |
| 5,812,852 A | 9/1998 | Poulsen et al. | |
| 5,999,729 A | 12/1999 | Tabloski, Jr. et al. | |
| 6,018,628 A | 1/2000 | Stoutamire | |
| 6,026,234 A | 2/2000 | Hanson et al. | |
| 6,088,511 A | 7/2000 | Hardwick | |
| 6,106,575 A | 8/2000 | Hardwick | |
| 6,260,036 B1 | 7/2001 | Almasi et al. | |
| 6,433,802 B1 | 8/2002 | Ladd | |
| 6,442,541 B1 | 8/2002 | Clark et al. | |
| 6,550,059 B1 | 4/2003 | Choe et al. | |
| 6,560,774 B1 | 5/2003 | Gordon et al. | |
| 6,622,301 B1 | 9/2003 | Hirooka et al. | |
| 6,708,331 B1 | 3/2004 | Schwartz | |
| 6,934,940 B2 | 8/2005 | Bates et al. | |
| 7,096,422 B2 | 8/2006 | Rothschiller et al. | |
| 7,171,655 B2 | 1/2007 | Gordon et al. | |
| 7,210,127 B1 | 4/2007 | Rangachari | |
| 7,373,640 B1 | 5/2008 | English et al. | |
| 7,464,103 B2 | 12/2008 | Siu et al. | |
| 7,533,246 B2 | 5/2009 | Taylor | |

(Continued)

FOREIGN PATENT DOCUMENTS

JP    5-298272    11/1993
WO    2012053017    4/2012

OTHER PUBLICATIONS

Hammes et al., "The SA-C Languange—Version 1.0", Jun. 21 2001, pp. 1-30.*

(Continued)

*Primary Examiner* — Li B Zhen
*Assistant Examiner* — Lenin Paulino
(74) *Attorney, Agent, or Firm* — Kevin Sullivan; Micky Minhas (57) ABSTRACT

A high level programming language provides a tile communication operator that decomposes a computational space into sub-spaces (i.e., tiles) that may be mapped to execution structures (e.g., thread groups) of data parallel compute nodes. An indexable type with a rank and element type defines the computational space. For an input indexable type, the tile communication operator produces an output indexable type with the same rank as the input indexable type and an element type that is a tile of the input indexable type. The output indexable type provides a local view structure of the computational space that enables coalescing of global memory accesses in a data parallel compute node.

18 Claims, 3 Drawing Sheets

(56) References Cited

U.S. PATENT DOCUMENTS

| | | | |
|---|---|---|---|
| 7,584,465 B1 | 9/2009 | Koh et al. | |
| 7,689,980 B2 | 3/2010 | Du et al. | |
| 7,739,466 B2 | 6/2010 | Rozas et al. | |
| 7,800,620 B2 | 9/2010 | Tarditi, Jr. et al. | |
| 7,853,937 B2 | 12/2010 | Janczewski | |
| 7,926,046 B2 | 4/2011 | Halambi et al. | |
| 7,979,844 B2 | 7/2011 | Srinivasan | |
| 7,983,890 B2 | 7/2011 | Bliss et al. | |
| 8,010,945 B1 | 8/2011 | Kilgard et al. | |
| 8,046,745 B2 | 10/2011 | Wong | |
| 8,060,857 B2 | 11/2011 | Biggerstaff | |
| 8,127,283 B2 | 2/2012 | Sheynin et al. | |
| 8,209,664 B2 | 6/2012 | Yu et al. | |
| 8,234,635 B2 | 7/2012 | Isshiki et al. | |
| 8,245,207 B1 | 8/2012 | English et al. | |
| 8,245,212 B2 | 8/2012 | Steiner | |
| 8,296,746 B2 | 10/2012 | Takayama et al. | |
| 8,402,450 B2 | 3/2013 | Ringseth et al. | |
| 8,549,496 B2 | 10/2013 | Cooke et al. | |
| 8,589,867 B2 | 11/2013 | Zhang et al. | |
| 8,713,039 B2 | 4/2014 | Ringseth et al. | |
| 8,806,426 B2 | 8/2014 | Duffy et al. | |
| 8,813,053 B2 | 8/2014 | Wang et al. | |
| 8,839,212 B2 | 9/2014 | Cooke et al. | |
| 8,839,214 B2 | 9/2014 | Ringseth et al. | |
| 2001/0051971 A1 | 12/2001 | Kato | |
| 2002/0019971 A1 | 2/2002 | Zygmont et al. | |
| 2002/0126124 A1 | 9/2002 | Baldwin et al. | |
| 2003/0145312 A1 | 7/2003 | Bates et al. | |
| 2003/0187853 A1 | 10/2003 | Hensley et al. | |
| 2004/0128657 A1 | 7/2004 | Ghiya et al. | |
| 2005/0028141 A1 | 2/2005 | Kurhekar et al. | |
| 2005/0071828 A1 | 3/2005 | Brokenshire et al. | |
| 2005/0149914 A1 | 7/2005 | Krapf et al. | |
| 2005/0210023 A1 | 9/2005 | Barrera et al. | |
| 2006/0036426 A1 | 2/2006 | Barr et al. | |
| 2006/0098019 A1 | 5/2006 | Tarditi, Jr. et al. | |
| 2006/0130012 A1 | 6/2006 | Hatano et al. | |
| 2006/0276998 A1 | 12/2006 | Gupta et al. | |
| 2007/0011267 A1 | 1/2007 | Overton et al. | |
| 2007/0079300 A1 | 4/2007 | Du et al. | |
| 2007/0127814 A1 | 6/2007 | Fluck et al. | |
| 2007/0169042 A1 | 7/2007 | Janczewski | |
| 2007/0169061 A1 | 7/2007 | Bera et al. | |
| 2007/0198710 A1 | 8/2007 | Gopalakrishnan | |
| 2007/0233765 A1* | 10/2007 | Gupta | G06F 11/263 |
| | | | 78/446 |
| 2007/0294666 A1 | 12/2007 | Papakipos et al. | |
| 2008/0005547 A1 | 1/2008 | Papakipos et al. | |
| 2008/0120594 A1 | 5/2008 | Lucas et al. | |
| 2008/0127146 A1 | 5/2008 | Liao et al. | |
| 2008/0134150 A1 | 6/2008 | Wong | |
| 2008/0162385 A1 | 7/2008 | Madani et al. | |
| 2008/0178165 A1 | 7/2008 | Baker | |
| 2008/0235675 A1 | 9/2008 | Chen | |
| 2009/0064115 A1 | 3/2009 | Sheynin et al. | |
| 2009/0089560 A1 | 4/2009 | Liu et al. | |
| 2009/0089767 A1 | 4/2009 | Daynes et al. | |
| 2009/0113404 A1 | 4/2009 | Takayama et al. | |
| 2009/0144747 A1 | 6/2009 | Baker | |
| 2009/0178053 A1 | 7/2009 | Archer et al. | |
| 2009/0204789 A1 | 8/2009 | Gooding et al. | |
| 2009/0271774 A1 | 10/2009 | Gordy et al. | |
| 2009/0307674 A1 | 12/2009 | Ng et al. | |
| 2009/0307699 A1 | 12/2009 | Munshi et al. | |
| 2010/0005080 A1 | 1/2010 | Pike et al. | |
| 2010/0082724 A1 | 4/2010 | Diyankov et al. | |
| 2010/0083185 A1 | 4/2010 | Sakai | |
| 2010/0094924 A1 | 4/2010 | Howard et al. | |
| 2010/0131444 A1 | 5/2010 | Gottlieb et al. | |
| 2010/0146245 A1 | 6/2010 | Yildiz et al. | |
| 2010/0174883 A1 | 7/2010 | Lerner et al. | |
| 2010/0199257 A1 | 8/2010 | Biggerstaff | |
| 2010/0229161 A1 | 9/2010 | Mori | |
| 2010/0235815 A1 | 9/2010 | Maybee et al. | |
| 2010/0241646 A1 | 9/2010 | Friedman et al. | |
| 2010/0241827 A1 | 9/2010 | Yu et al. | |
| 2010/0275189 A1 | 10/2010 | Cooke et al. | |
| 2010/0293534 A1 | 11/2010 | Andrade et al. | |
| 2011/0271263 A1 | 11/2011 | Archer et al. | |
| 2011/0276789 A1* | 11/2011 | Chambers | G06F 9/445 |
| | | | 712/220 |
| 2011/0314256 A1 | 12/2011 | Callahan, II et al. | |
| 2011/0314444 A1 | 12/2011 | Zhang et al. | |
| 2012/0005662 A1 | 1/2012 | Ringseth et al. | |
| 2012/0124564 A1 | 5/2012 | Ringseth et al. | |
| 2012/0131552 A1 | 5/2012 | Levanoni et al. | |
| 2012/0151459 A1 | 6/2012 | Ringseth | |
| 2012/0166444 A1* | 6/2012 | Ringseth | G06F 8/314 |
| | | | 707/741 |
| 2012/0166771 A1 | 6/2012 | Ringseth | |
| 2014/0109039 A1 | 4/2014 | Cooke et al. | |

OTHER PUBLICATIONS

Belter, et al., "Automatic Generation of Tiled and Parallel Linear Algebra Routines", Retrieved at << http://vecpar.fe.up.pt12010/workshops-iWAPT/Belter-Siek-Karlin-Jessup.pdf>>, Jul. 5, 2010, pp. 15.

Mattson, Tim, "Data Parallel Design Patterns", Retrieved at << http://parlab.eecs.berkeley.edu/wiki/_media/patterns/data_parallel.pdf>>, Jul. 5, 2010, pp. 7.

Brodman, et al., "New Abstractions for Data Parallel Programming", Retrieved at << http://www.usenix.org/event/hotpar091tech/full_papers/brodman/brodman_html/>>, Proceedings of the First USENIX conference on Hot topics in parallelism, 2009, pp. 11.

Gan, Ge, "Tile Reduction: the first step towards tile aware parallelization in OpenMP", Retrieved at << https://iwomp.zih.tu-dresden.de/downloads/TileReduction-Gan.pdf>>, Jul. 5, 2010, pp. 19.

Du, et al., "A Tile-based Parallel Viterbi Algorithm for Biological Sequence Alignment on GPU with CUDA", Retrieved at << http://www.hicomb.org/papers/HICOMB2010-03.pdf>>, Parallel & Distributed Processing, Workshops and Phd Forum (IPDPSW), 2010 IEEE International Symposium on, Apr. 19-23, 2010, pp. 8.

Goumas, et al., "Data Parallel Code Generation for Arbitrarily Tiled Loop Nests", Retrieved at <<http://www.cslab.ece.ntua.gr/~maria/papers/PDPTA02.pdf>>, Proceedings of the International Conference on Parallel and Distributed Processing Techniques and Applications, vol. 2, Jun. 24-27, 2002, pp. 7.

Hadri, et al., "Enhancing Parallelism of Tile QR Factorization for Multicore Architectures", Retrieved at << http://www.netlib.org/lapack/lawnspdf/lawn222.pdf>>, Dec. 2009, pp. 19.

"International Search Report and Written Opinion", Mailed Date: Apr. 10, 2012, Application No. PCT/US2011/053017, Filed Date: Sep. 23, 2011, pp. 9.

Hammes, et al., "The SA-C Language—Version 1.0", Retrieved at << www.cs.colostate.edu/canneron/Documents/sassy.pdf>>, Technical manual, Jun. 21, 2001, pp. 1-30.

Hammes, et al., "High Performance Image Processing on FPGAs", Retrieved at << www.cs.colostate.edu/cameron/Publications/hammes_lacsi01.pdf>>, Los Almos Computer Science Institute Symposium, Santa Fe, NM, Oct. 15-18, 2001, pp. 10.

The Notice of Allowance mailed Nov. 29, 2012 (16 pgs.).

Nagaraja, et al., "A Parallel Merging Algorithm and Its Implementation With Java Threads", Retrieved at << http://citeseerx.ist.psu.edu/viewdoc/download?doi=10.1.1.90.2389&rep=rep1&type=pdf>>, Proceedings of MASPLAS'01 The Mid-Atlantic Student Workshop on Programming Languages and Systems, Apr. 27, 2001, p. 15.1-15.7.

Singhai, et al., "A Parametrized Loop Fusion Algorithm for Improving Parallelism and Cache Locality", Retrieved at << http://citeseerx.ist.psu.edu/viewdoc/download;jsessionid=7CFB7671C0A7F17205BA6BDB9BA66043?doi=10.1.1.105.6940&rep=rep1&type=pdf >>, The Computer Journal, vol. 40, No. 6, 1997, p. 340-355.

Yang, et al, "Integrating Parallel Algorithm Design With Parallel Machine Models", Retrieved at << http://www.dis.eafit.edu.co/

(56) References Cited

OTHER PUBLICATIONS depto/documentos/p131-yang - Integrating Parallel Algorithm Design With Parallel Machine Models.pdf >>, vol. 27, No. 1, Mar. 1995, p. 131-135.

Peter M. Kogge et al., A Parallel Algorith for the Efficient Solution of a General Class of Recurrence Equations, IEEE vol. C-22 Issue 8, Aug. 1973, [Retrieved on Aug. 29, 2012]. Retrieved from the internet: <URL: http://ieeexplore.ieee.org/stamp/stamp.jsp?tp=&arnumber=5009159> 8 Pages (786-793).

Peiyi Tang et al., Processor Self-Scheduling for Multiple-Nested Parallel Loops , IEEE, 1986, [Retrieved on Aug. 29, 2012]. Retrieved from the Internet: <URL: http://www.ualr.edu/pxtang/papers/icpp86.pdf> 8 Pages (528-535).

John H. Reif, An optimal Parallel Algorith for Integer Sorting, Oct. 1985, [Retrieved on Aug. 29, 2012]. Retrieved from the Internet: <URL: http://ieeexploreieee.org/stamp/stamp.jsp?tp=&arnumber=4568176> 9 Pages (496-504).

"International Search Report", Mailed Date: May 16,2012, Application No. PCT/US2011/058637, Filed Date: Oct. 31, 2011, pp. 8.

Catanzaro, Bryan et al., "Copperhead: Compiling an Embedded Data Parallel Language," Electrical Engineering and Computer Sciences, University of California at Berkeley, pp. 12, (Oct. 16, 2010).

Svensson Joel, et al., "GPGPU Kernal Implementation and Refinement Using Obsidian," Procedia Computer Science, vol. 1, No. 1, pp. 2065-2074.

Sato, Shigeyuki et al., A Skeletal Parallel Framework with Fusion Optimizer for CPCPU Programming, Programming Languages and Systems, pp. 79-94 (2009).

Lee, Sean et al., "GPU Kernels as Data-Parallel Array Computations in Haskell," Workshop on Exploiting Parallelism using GPUs and other Hardware-Assisted Methods (EPHAM) pp. 1-10 (Mar. 22, 2009).

The Office Action for U.S. Appl. No. 12/949,908 mailed Feb. 4, 2013 (22 pgs).

Yair Shapira, "Solving Pdes in C++: Numerical methods in a unified Object-oriented Approach", SIAM, Jan. 13, 2006.

The Final Office Action for U.S. Appl. No. 12/949,908 mailed Aug. 27, 2013 (16 pgs).

The Advisory Action for U.S. Appl. No. 12/949,908 mailed Nov. 12, 2013 (2 pgs).

The Examiner-Initiated Interview Summary for U.S. Appl. No. 12/949,908 mailed Jan. 14, 2014 (2 pgs).

The Applicant-Initiated Interview Summary for U.S. Appl. No. 12/949,908 mailed Jan. 21, 2014 (4 pgs).

The Office Action for U.S. Appl. No. 12/949,908 mailed Feb. 13, 2014 (18 pgs).

The Final Office Action for U.S. Appl. No. 12/949,908 mailed Jun. 26, 2014 (21 pgs).

The Office Action for U.S. Appl. No. 12/949,908 mailed Nov. 3, 2014 (24 pgs).

The Final Office Action for U.S. Appl. No. 12/949,908 mailed Apr. 16, 2015 (21 pgs).

Chien, Andrew A., "ICC++- A C++Dialect for High Performance Parallel Computing", Retrieved at << http://delivery.acm.org/10.1145/250000/240740/p19-chien.pdf?key1=240740&key2=9793729721&coll=Guide&dl=Guide&Cfid=97193401&Cftoken=57231285>>, vol. 4, No. 1, 1996, p. 19-23.

"Const Correctness", Retrieved at << http://www.cprogramming.com/tutorial/const_correctness.html>>, retrieved date; Jul. 16, 2010, pp. 4.

Wu, et al., "GPU-Accelerated Large Scale Analytics", Retrieved at << http://www.hpl.hp.com/techreports/2009/HPL-2009-38.pdf>>, Mar. 6, 2009, pp. 11.

"Const and Immutable", Retrieved at << http://www.digitalmars.com/d/2.0/const3.html>>, Retrieved date: Jul. 16, 2010, pp. 7.

Avila, Rafael Bohrer, "A comparative study on DPC++and other concurrent object-oriented languages", Retrieved at << http://www.google.co.uk/url?sa=t&source=web&cd=1&ved=0CBcC2FjAA&url=http%3A%2F%2Fciteseerx.ist.psu.

edu%2Fviewdoc%2Fdownload%3Fdoi%3D10.1.1.27.3438%26rep%3Drep1%26type%3Dpdf&ei=YNO_TOrSFob2OwSvnLWQBw&usg=AFQjCNHWqmYZDo50QaGXW7NbLEIhxhMG5A >>, Dec. 1997, pp. 1-41.

The Office Action for U.S. Appl. No. 12/975,796 mailed Mar. 19, 2013 (29 pgs.).

Shih et al., Efficient Index Generation for Compiling Two-Level Mappings in Data-Parallel Programs, published by Journal of Parallel and distributed Computing, 2000, pp. 189-216.

The Final Office Action for U.S. Appl. No. 12/975,796 mailed Nov. 6, 2013 (27 pgs.).

The Office Action for U.S. Appl. No. 12/975,796 mailed Jun. 19, 2014 (27 pgs.).

The Final Office Action for U.S. Appl. No. 12/975,796 mailed Jan. 16, 2015 (21 pgs.).

Chamberlain, et al., "User-Defined Distributions and Layouts in Chapel: Philosophy and Framework", Retrieved at << http://chapel.cray.com/publications/hotpar10-final.pdf>>, 2nd USENIX Workshop on Hot Topics in Parallelism, Jun. 2010, pp. 6.

Diaconescu, et al., "An Approach to Data Distributions in Chapel", Retrieved at << http://citeseemist.psu.edu/viewdoc/download-?doi=10.1.1.94.8748&rep=rep1&type=pdf>>, International Journal of High Performance Computing Applications, vol. 21, No. 3, Aug. 2007, pp. 313-335.

Moore, Reagan W., "Digital Libraries, Data Grids, and Persistent Archives", Retrieved at << http://www.sdsc.edu/Nara/Publications/Web/Rice-DL-12-01.ppt>>, Jan. 30, 2002, pp. 30.

Chang, et al., "Bigtable: A Distributed Storage System for Structured Data", Retrieved at << http://labs.google.com/ papers/bigtable-osdi06.pdf>>, In Proceedings of the 7th Conference on USENIX Symposium on Operating Systems Design and Implementation, vol. 7, 2006, pp. 1-14.

R.D. Blumofe, C.E. Leiserson, "Scheduling multithreaded computations by work stealing," pp. 356-368, 35th Annual Symposium on Foundations of Computer Science (FOCS 1994), 1994.

"International Search Report and Written Opinion", Mailed Date—Aug. 9, 2012, Application No. PCT/US2011/066285, Filed Date—Dec. 20, 2011, pp. 8.

The Notice on the First Office Action for Chinese Application No. 201110434003.2 mailed Jan. 13, 2014 (3 pages).

The Office Action for U.S. Appl. No. 12/977,406 mailed Aug, 31, 2012 (14 pgs).

The Final Office Action for U.S. Appl. No. 12/977,406 mailed Feb. 20, 2013 (17 pgs).

The Office Action for U.S. Appl. No. 12/977,406 mailed Jul. 18, 2013 (19 pgs).

The Notice of Allowance for U.S. Appl. No. 12/977,406 mailed Dec. 11, 2013 (21 pgs).

R Jagannathan et al. "GLU_A High_Level System for Granular Data_Parallel Programming" ,Oct. 1995 pp. 1-25.

Mark Chu-Carroll et al. "Design and Implementation of a General Purpose Parallel Programming System," Department of Computer and Information Sciences University of Delaware, Nov. 14, 1995, pp. 1-9.

Diaconescu, Roxana et al. "Reusable and Extensible High Level Data Distributions", Workshop on Patterns in High Performance Computing, May 4-6, 2005, University of Illinois at Urbana-Champaign, pp. 1-10.

Petricek, Tomas, "Accelerator and F# (III.): Data-Parallel programs using F# quotations". << http://tomasp.net/blog/accelerator-dataparallel.aspx>> Retrieved Oct. 20, 2010. pp. 2-9.

"Array Building Blocks: A Flexible Parallel Programming Model for Multicore and Many-Core Architectures" << http://www.drdobbs.com/go-parallel/article/showArticle.jhtml:jsessionid=51NYX1OZXP>> Retrieved Oct. 20, 2010. pp. 1-4.

Hains, et al., "Array Structures and Data-Parallel Algorithms" Laboratoire d'informatique fondamentale d'Orleans, BP6759—45067 Orleans Cedex 2, France. pp. 1-8.

Keller, et al., "Regular, Shape-polymorphic, Parallel Arrays in Haskell", << http://www.cse.unsw.edu.au/-chak/papers/KCLPL10.html>> Retrieved Dec. 2010. pp. 1-12.

(56) References Cited

OTHER PUBLICATIONS

Hermann, et al., "Size Inference of Nested Lists in Functional Programs" Fakultat fur Mathematik und Informatik, Universitat Passau, Germany. pp. 1-16.
The Office Action for U.S. Appl. No. 12/963,868 mailed May 21, 2013 (20 pgs.).
The Final Office Action for U.S. Appl. No. 12/963,868 mailed Dec. 10, 2013 (18 pgs.).
The Office Action for U.S. Appl. No. 12/963,868 mailed Jun. 20, 2014 (19 pgs.).
The Final Office Action for U.S. Appl. No. 12/963,868 mailed Jan. 26, 2015 (19 pgs.).
Blelloch, et al., "Implementation of a Portable Nested Data-Parallel Language", Retrieved at << http://www.cs.cmu.edu/~jch/publications/nesl-ppopp93.pdf>>, Fourth ACM SIGPLAN Symposium on Principles and Practice of Parallel Programming (PPoPP), ACM, 1993, pp. 10.
Chakravarty, et al., "V—Nested Parallelism in C", Retrieved at << http://citeseerx.ist.psu.edu/viewdoc/download? doi=10.1.1.55.8578 &rep=rep1Mype=pdf>>, Programming Models for Massively Parallel Computers, Oct. 9-12, 1995, pp. 1-9.
Miao, et al., "Extracting Data Records from the Web Using Tag Path Clustering", Retrieved at << http://www2009.org/proceedings/pdf/p981.pdf>>, The 18th International World Wide Web Conference, Apr. 20-24, 2009, pp. 981-990.
Emoto, et al., "Generators-of-generators Library with Optimization Capabilities in Fortress", Retrieved at << http://research.nii.ac.jp/~hu/pub/europar10.pdf>>, 16th International European Conference on Parallel and Distributed Computing (EuroPar 2010), Aug. 31-Sep. 3, 2010, pp. 1-12.
Sengupta, et al., "Efficient Parallel Scan Algorithms for GPUs", Retrieved at << http://mgarland.org/files/papers/nvr-2008-003.pdf>>, NVIDIA Technical Report NVR-2008-003, Dec. 2008, pp. 1-17.
Takahashi, et al., "Efficient Parallel Skeletons for Nested Data structures", Retrieved at << http://research.nii.ac.jp/~hu/pub/pdpta2001-TIH.pdf>>, The International Conference on Parallel and Distributed Processing Techniques and Applications, (PDPTA), Jun. 25-28, 2001, pp. 7.
Blelloch, et al., "Segmented Operations for Sparse Matrix Computation on Vector Multiprocessors" School of Computer Science, Carnegie Mellon University, Pittsburgh, PA 15213, Aug. 1993, CMU-CS-93-173, pp. 1-23.
Garland et al., "Efficient Sparse Matrix-Vector Multiplication on CUDA", NVIDIA Technical Report NVR-2009-004, Dec. 2008, pp. 1-32.
Blelloch, et al., "Scans as Primitive Parallel Operations," IEEE Transactions on Computers, vol. 38, No. 11, pp. 1526-1538, Nov. 1989.
Grode, et al., "Hardware Resource Allocation for Hardware/Software Partitioning in the LYCOS System", In Proceedings of the Conference on Design, Automation and Test in Europe, Feb. 23, 1998, pp. 22-27.
The Notice of Allowance for U.S. Appl. No. 12/975,796 mailed Jul. 22, 2015 (28 pgs.).
The Notice of Allowance for U.S. Appl. No. 12/975,796 mailed Nov. 19, 2015 (11 pgs.).
The Notice of Allowance for U.S. Appl. No. 12/963,868 mailed Jul. 21, 2015 (28 pgs.).
The Notice of Allowance for U.S. Appl. No. 12/963,868 mailed Dec. 8, 2015 (12 pgs.).
The Notice of Allowance for U.S. Appl. No. 12/975,796 mailed Mar. 11, 2016 (11 pgs.).
The Notice of Allowance for U.S. Appl. No. 12/963,868 mailed Mar. 15, 2016 (10 pgs.).
"Current Status of High Performance Fortran" written by Hitoshi Murai et al. and printed in System/Control/Information published on Jan. 15, 2008 (vol. 52, No. 1, pp. 14-20, 8 pages). (This reference was cited in an Office Action from a related foreign application. A concise explanation of relevance is submitted with an English language translation of the Notice of Reasons for Rejection. (4 pages)).
"WinPC Labs GPGPU" written by Takeshi Nishi and printed in Nikkei WinPC published by Nikkei BP Publications, Inc. on Apr. 29, 2010 (vol. 16, No. 9, pp. 164-165, 3 pages). (This reference was cited in an Office Action from a related foreign application. A concise explanation of relevance is submitted with an English language translation of the Notice of Reasons for Rejection. (4 pages)).
Doman, et al., "PARADOCS: A Highly Parallel Dataflow Computer and Its Dataflow Language", In Journal: Microprocessing and Microprogramming, vol. 7, Issue 1, Jan. 1, 1981, 12 Pages.
The Notice of Allowance for U.S. Appl. No. 12/949,908 mailed Apr. 25, 2016 (36 pgs.).

* cited by examiner

```
//
// tile_range pseudo-field -- pseudo-field collection type for tiling
//
template <int _Rank, class _Parent_type>
struct tile_range : public _Parent_type {
    //
    // creation ctor
    //
    template <typename _Other_Parent_type>
    tile_range(const grid<_Rank>& _Grid, const extent<_Rank>& _multiplier,
const _Other_Parent_type& _Parent)
        : m_grid(_Grid), m_multiplier(_multiplier), _Parent_type(_Parent) {
    }
    //
    // index ops and recursive tiling or splitting uses this ctor
    //
    template <typename _Other_Parent_type>
    tile_range(const grid<_Rank>& _Grid, const _Other_Parent_type& _Parent)
        : m_grid(_Grid), m_multiplier(_Parent.get_multiplier()),
_Parent_type(_Parent) {
    }
    //
    // index op - uses 'section' sub-pseudo-field ctor
    //
    __DECLSPEC_VECTOR
    const element_type operator[] (const index<_Rank>& _Index) const {
        grid<element_rank> _element_grid(get_element_grid().get_extent(),
                                    (m_grid.get_offset() +
_Index)*m_multiplier);
        return _Parent_type(_element_grid, *(const _Parent_type*)this);
    }
private:
    grid<_Rank> m_grid;
    extent<_Rank> m_multiplier;
};

//
// Tile communication operator.
//
template <int _Rank, typename _Parent_type>
__DECLSPEC_VECTOR
tile_range<_Rank, _Parent_type> tile(const _Parent_type& _Parent, const
extent<_Rank>& _Tile) {
    extent<_Rank> e(_Parent.get_grid().get_extent()/_Tile);
    return tile_range<_Rank, _Parent_type> (grid<_Rank>(e),
                                    _Tile,
                                    _Parent);
}
```

TILE COMMUNICATION OPERATOR

BACKGROUND

Computer systems often include one or more general purpose processors (e.g., central processing units (CPUs)) and one or more specialized data parallel compute nodes (e.g., graphics processing units (GPUs) or single instruction, multiple data (SIMD) execution units in CPUs). General purpose processors generally perform general purpose processing on computer systems, and data parallel compute nodes generally perform data parallel processing (e.g., graphics processing) on computer systems. General purpose processors often have the ability to implement data parallel algorithms but do so without the optimized hardware resources found in data parallel compute nodes. As a result, general purpose processors may be far less efficient in executing data parallel algorithms than data parallel compute nodes.

Data parallel compute nodes have traditionally played a supporting role to general purpose processors in executing programs on computer systems. As the role of hardware optimized for data parallel algorithms increases due to enhancements in data parallel compute node processing capabilities, it would be desirable to enhance the ability of programmers to program data parallel compute nodes and make the programming of data parallel compute nodes easier.

A common technique in computational linear algebra is a tile or block decomposition algorithm where the computational space is partitioned into sub-spaces and an algorithm is recursively implemented by processing each tile or block as if it was a point. Such a decomposition, however, involves a detailed tracking of indices and the relative geometry of the tiles and blocks. As a result, the process of creating the indices and geometry may be error prone and difficult to implement.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A high level programming language provides a tile communication operator that decomposes a computational space into sub-spaces (i.e., tiles) that may be mapped to execution structures (e.g., thread groups) of data parallel compute nodes. An indexable type with a rank and element type defines the computational space. For an input indexable type, the tile communication operator produces an output indexable type with the same rank as the input indexable type and an element type that is a tile of the input indexable type. The output indexable type provides a local view structure of the computational space that enables coalescing of global memory accesses in a data parallel compute node.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
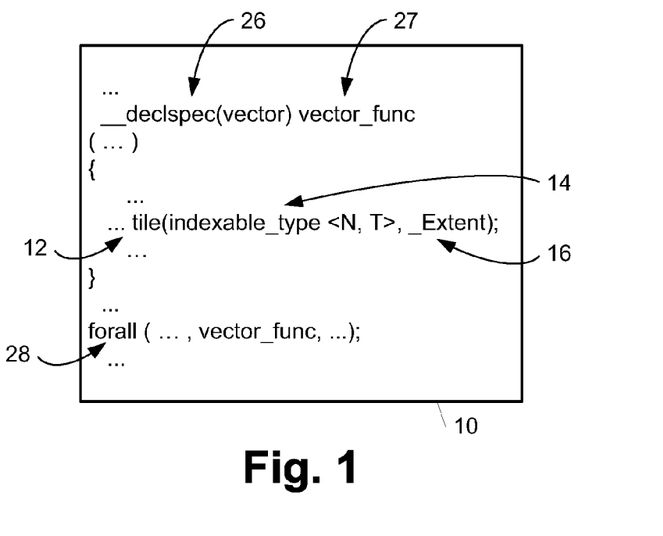
FIG. 1 is a computer code diagram illustrating an embodiment of code with a tile communication operator.

FIG. 1 is a computer code diagram illustrating an embodiment of code 10 with a tile communication operator 12. When compiled and executed, tile communication operator 12 decomposes a computational space (represented by indexable_type <N, T> in the embodiment of FIG. 1) into sub-spaces (i.e., tiles) defined by an extent (represented by _Extent in the embodiment of FIG. 1). The tiles may be mapped to execution structures (e.g., thread groups (DirectX), thread blocks (CUDA), work groups (OpenCL), or waves (AMD/ATI)) of data parallel (DP) optimal compute nodes such as DP optimal compute nodes 121 shown in FIG. 5 and described in additional detail below.

Figure 5:
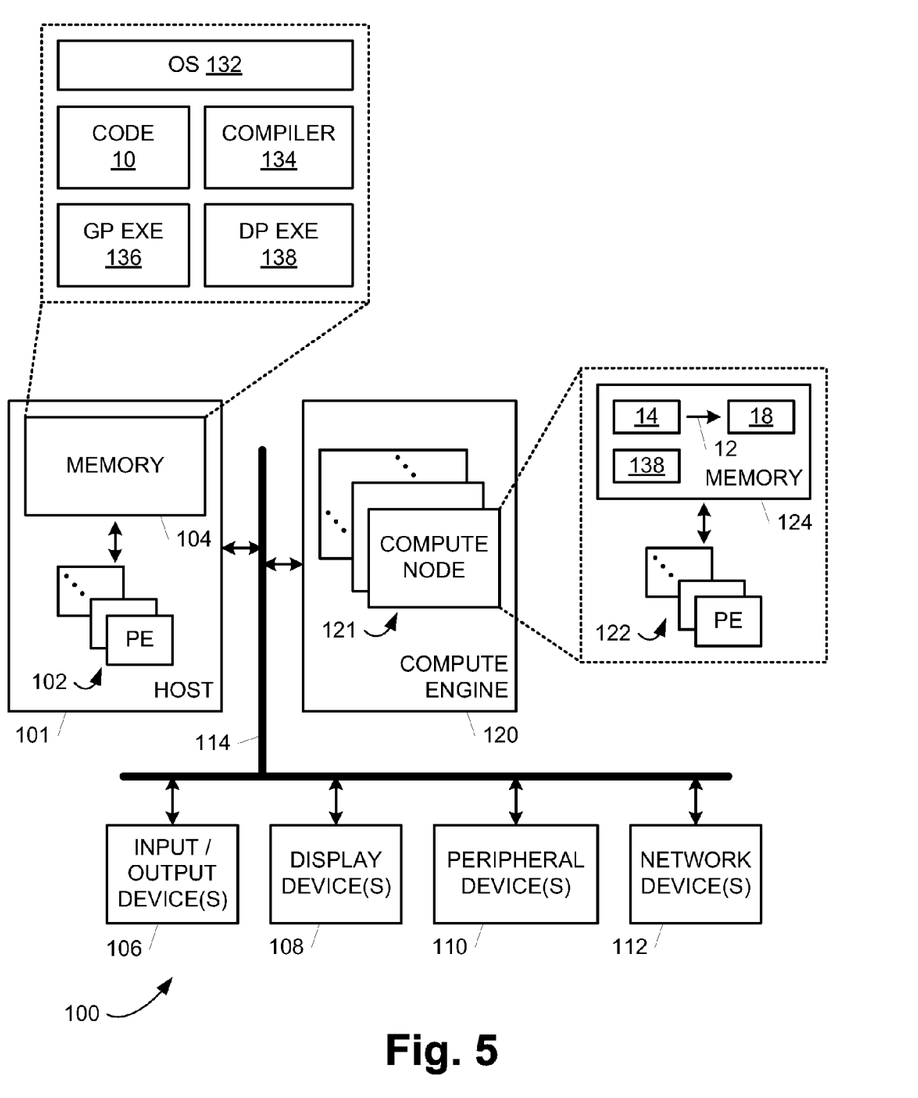
FIG. 5 is a block diagram illustrating an embodiment of a computer system configured to compile and execute data parallel code that includes a tile communication operator.

Code 10 includes a sequence of instructions from a high level general purpose or data parallel programming language that may be compiled into one or more executables (e.g., DP executable 138) for execution by one or more DP optimal compute nodes (e.g., DP optimal compute nodes 121 shown in FIG. 5).

In one embodiment, code 10 includes a sequence of instructions from a high level general purpose programming language with data parallel extensions (hereafter GP language) that form a program stored in a set of one or more modules. The GP language may allow the program to be written in different parts (i.e., modules) such that each module may be stored in separate files or locations accessible by the computer system. The GP language provides a single language for programming a computing environment that includes one or more general purpose processors and one or more special purpose, DP optimal compute nodes. DP optimal compute nodes are typically graphic processing units (GPUs) or SIMD units of general purpose processors but may also include the scalar or vector execution units of general purpose processors, field programmable gate arrays (FPGAs), or other suitable devices in some computing environments. Using the GP language, a programmer may include both general purpose processor and DP source code in code 10 for execution by general purpose processors and DP compute nodes, respectively, and coordinate the execution of the general purpose processor and DP source code. Code 10 may represent any suitable type of code in this embodiment, such as an application, a library function, or an operating system service.

The GP language may be formed by extending a widely adapted, high level, and general purpose programming language such as C or C++ to include data parallel features. Other examples of general purpose languages in which DP features may appear include Java™, PHP, Visual Basic, Perl, Python™, C#, Ruby, Delphi, Fortran, VB, F#, OCaml, Haskell, Erlang, NESL, Chapel, and JavaScript™. The GP language may include rich linking capabilities that allow different parts of a program to be included in different modules. The data parallel features provide programming tools that take advantage of the special purpose architecture of DP optimal compute nodes to allow data parallel operations to be executed faster or more efficiently than with general purpose processors (i.e., non-DP optimal compute nodes). The GP language may also be another suitable high level general purpose programming language that allows a programmer to program for both general purpose processors and DP optimal compute nodes.

In another embodiment, code 10 includes a sequence of instructions from a high level data parallel programming language (hereafter DP language) that form a program. A DP language provides a specialized language for programming a DP optimal compute node in a computing environment with one or more DP optimal compute nodes. Using the DP language, a programmer generates DP source code in code 10 that is intended for execution on DP optimal compute nodes. The DP language provides programming tools that take advantage of the special purpose architecture of DP optimal compute nodes to allow data parallel operations to be executed faster or more efficiently than with general purpose processors. The DP language may be an existing DP programming language such as HLSL, GLSL, Cg, C, C++, NESL, Chapel, CUDA, OpenCL, Accelerator, Ct, PGI GPGPU Accelerator, CAPS GPGPU Accelerator, Brook+, CAL, APL, Fortran 90 (and higher), Data Parallel C, DAPPLE, or APL. Code 10 may represent any suitable type of DP source code in this embodiment, such as an application, a library function, or an operating system service.

Code 10 includes code portions designated for execution on a DP optimal compute node. In the embodiment of FIG. 1 where code 10 is written with a GP language, the GP language allows a programmer designate DP source code using an annotation 26 (e.g., _declspec(vector) . . . ) when defining a vector function. The annotation 26 is associated with a function name 27 (e.g., vector_func) of the vector function that is intended for execution on a DP optimal compute node. Code 10 may also include one or more invocations 28 of a vector function (e.g., forall . . . , vector_func, . . . ) at a call site (e.g., forall, reduce, scan, or sort). A vector function corresponding to a call site is referred to as a kernel function. A kernel function may call other vector functions in code 10 (i.e., other DP source code) and may be viewed as the root of a vector function call graph. A kernel function may also use types (e.g., classes or structs) defined by code 10. The types may or may not be annotated as DP source code. In other embodiments, other suitable programming language constructs may be used to designate portions of code 10 as DP source code and/or general purpose processor code. In addition, annotations 26 may be omitted in embodiments where code 10 is written in a DP language.

Figure 2:
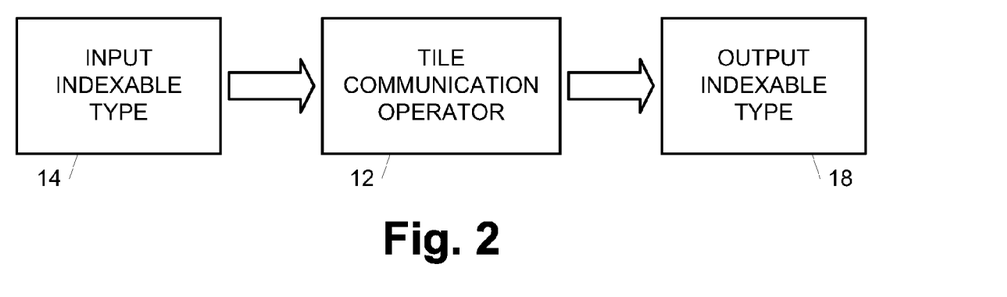
FIG. 2 is a block diagram illustrating an embodiment of applying a tile communication operator to an input indexable type.

FIG. 2 is a block diagram illustrating an embodiment of applying tile communication operator 12 to input indexable type 14 to produce an output indexable type 18. As used herein, an indexable type is any data type that implements one or more subscript operators along with a rank, which is a non-negative integer, and a type which is denoted element_type. If index<N> is a type that represents N-tuples of integers (viz., any type of integral data type), an instance of index<N> is a set of N integers {i0, i1, . . . , im} where m is equal to N−1 (i.e., an N-tuple). An index operator of rank N takes an N-tuple instance of index<N> and associates the instance with another instance of a type called the element type where the element type defines each element in an indexable type. In one embodiment, an indexable type defines one or more of the following operators:

```
element_type operator[ ] (index_declarator);
    const element_type operator[ ] (index_declarator)
const;
    element_type& operator[ ] (index_declarator); or
    const element_type& operator[ ] (index_declarator)
const;
    where index_declarator takes the form of at least one
of:
    const index<rank>& idx;
    const index<rank> idx;
    index<rank>& idx;
    index<rank> idx.
```

In other embodiments the operators may be functions, functors or a more general representation. The category of indexable types with a given rank and element type has an initial object called field. An indexable type has a shape that is a polytope—i.e., an indexable type may be algebraically represented as the intersection of a finite number of half-planes formed by linear functions of the coordinate axes.

With reference to FIGS. 1 and 2, the high level language of code 10 provides a tile communication operator 12 for use on input indexable type 14 in a data parallel computing environment. Input indexable type 14 has a rank (e.g., rank N in the embodiment of FIG. 1) and element type (e.g., element type T in the embodiment of FIG. 1) and defines the computational space that is decomposed by tile communication operator 12. For each input indexable type 14, the tile communication operator produces an output indexable type 18 with the same rank as input indexable type 14 and an element type that is a tile of input indexable type 14.

Figure 3:
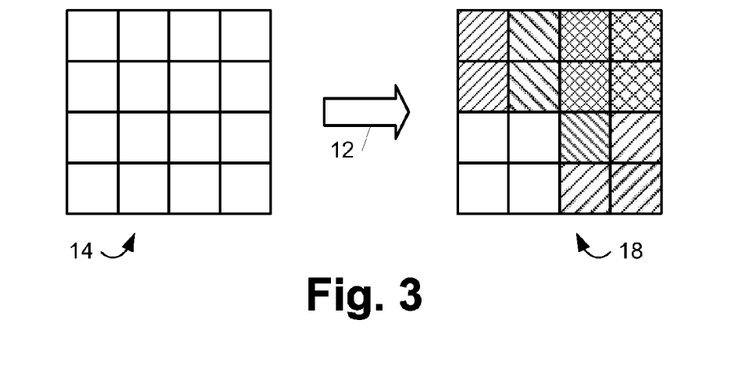
FIG. 3 is a block diagram illustrating an embodiment of generating an output indexable type with a tile communication operator.

FIG. 3 is a block diagram illustrating an embodiment of generating an output indexable type 18 with tile communication operator 12. In the example of FIG. 3, tile communication operator 12, using a 2×2 tile, partitions a 4×4 input indexable type 14 into a 2×2 output indexable type 18. As another example (not shown), given an input indexable type 14 that is a 1024×1024 matrix and a tile of 64×64, the output indexable type 18 represents 16×16 tiles (64*16=1024).

Tile communication operator 12 represents a range pattern of data decomposition. The range pattern involves a collection of indexable types. Let Indexable<N> be any input indexable type 14 of rank N, meaning the index operators act on instances of type index<N>. The return type of the subscript operator (i.e., the element type) is Indexable<N>::element_type.

The calculus of tile communication operator 12 yields the following isomorphism. For tile, tile<grid_tile>: Indexable<N>->range<N, Indexable<N>> and range<N, Indexable<N>> is the collection of Indexable<N> restricted to grid_tile, indexed by Indexable<N>/grid_tile. More particularly, if grid describes the shape of Indexable<N>, then range<N, Indexable<N>> is the collection of Indexable<N> restricted to grid_tile translated by offset in grid_range=(grid+grid_tile−1)/grid_tile. Accordingly, grid_range is the shape of range<N, Indexable<N>> when created by tile<grid_tile> (Indexable<N>).

All 'range' instances constructed by tile communication operator 12 take the original domain of the definition or shape of Indexable<N>, which, without loss of generality, is referred to as Indexable<N>.grid. By definition, the index operators of Indexable<N> act on every index<N> described by Indexable<N>.grid. In forming range<N1, Indexable<N2>>, a partitioning of Indexable<N>.grid is formed and the collection defined by range<N1, Indexable<N2>> is the original Indexable<N> restricted to a N2-dimensional partitioning—the set of which is parameterized by an N1-dimensional set of index<N1>. The optimization deducible by a compiler at compile time is that range<N, Indexable<N>> is a partitioning of the original Indexable<N>.

In one example where the input indexable type 14 is defined as "range", the tile communications operator 12 "tile" in the following code portion may be used to tile the range input indexable type 14 into an output indexable type 18.

```
//
// Tile communication operator.
//
template <int _Rank, typename _Parent_type>
   __DECLSPEC_VECTOR
tile_range<_Rank, _Parent_type> tile
      (
         const _Parent_type& _Parent,
         const extent<_Rank>& _Tile
      )
{
   extent<_Rank>
   e(_Parent.get_grid( ).get_extent( )+_Tile−1/_Tile);
   return tile_range<_Rank, _Parent_type>
         (grid<_Rank>(e),
          _Tile,
          _Parent_type(grid<_Rank>(_Tile), _Parent));
}
```

In the above code portion, grid<_Rank>(e) describes the shape of tile_range as a collection of tiles. _Tile is the multiplier or step taken by tile_range, viz., 'the next tile' is an increment by _Tile. The last parameter:
Parent_type(grid<_Rank>(_Tile), _Parent)
is a representation of a _Tile-shaped sub-object of _Parent. In fact, for an indexable type to allow tiling, meaning valid for the 'tile( . . . )' communication operator, it is sufficient that it have a constructor of signature:
Parent_type(const grid<_Rank>& _Sub_grid, const _Parent_type& _Parent);

In another example where the input indexable type 14 is defined as a field initial object (i.e., "field"), the tile communications operator 12 "tile" in the following code portion may be used to tile the field input indexable type 14 into an output indexable type 18.

```
//
// Tile communication operator.
//
template <int _Rank, typename _Element_type>
   __DECLSPEC_VECTOR
tile_range<_Rank, field<_Rank, _Element_type>> tile
      (
         const field<_Rank, _Element_type>& _Parent,
         const extent<_Rank>& _Tile
      )
{
   extent<_Rank>
   e(_Parent.get_grid( ).get_extent( )+_Tile−1/_Tile);
   return tile_range<_Rank, field<_Rank, _Element_type>>
         (grid<_Rank>(e),
          _Tile,
          field<_Rank, _Element_type> (grid<_Rank>(_Tile),
          _Parent));
}
```

In the above code portion, grid<_Rank>(e) describes the shape of tile_range as a collection of tiles. _Tile is the multiplier or step taken by tile_range, viz., 'the next tile' is an increment by _Tile. The last parameter: field<_Rank, _Element_type> (grid<_Rank>(_Tile), _Parent) is a representation of a _Tile-shaped sub-object of field<_Rank, _Element_type>.

Figure 4:
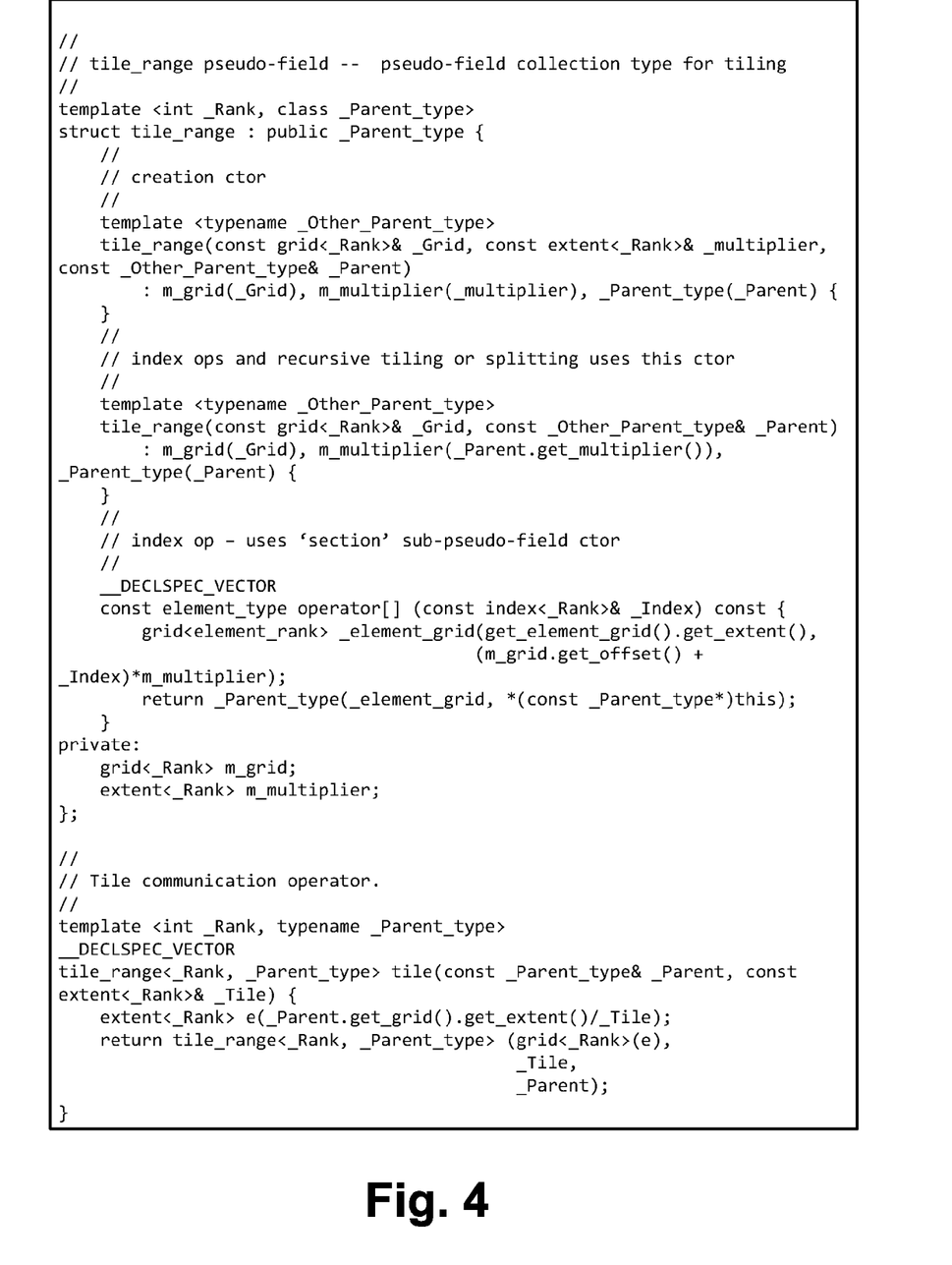
FIG. 4 is a computer code diagram illustrating an embodiment of code that implements a tile communication operator.

FIG. 4 is a computer code diagram illustrating an embodiment of code that implements tile communication operator 12 and an output indexable type 18. In the code shown in FIG. 4, the data structure "tile_range" forms the output indexable type 18 (also referred to as a "pseudo-field") for the tile communication operator 12 "tile". The index operator of tile_range takes: const index<_Rank>& _Index and forms a field or pseudo-field whose extent is _Tile and whose offset is:
_Index*m_muitiplier within the _Parent it is constructed from.

Output indexable type 18 provides a local view structure of the computational space (i.e., input indexable type 14) of a data parallel algorithm that enables coalescing of global memory accesses in a DP optimal compute node. The local structure of a data parallel algorithm forms a scheduling pattern that corresponds to an execution structure (e.g., thread groups, thread blocks, work groups, or waves) of a DP optimal compute node. For DP optimal compute nodes that include Streaming SIMD Extension (SSE) compute engines, the local structure is analogous to strip mining extents formed through loop tiling or loop blocking. Local structure interacts with fast local or shared memory of a DP optimal compute node (e.g., efficient scratch pad memory or a cache) to yield higher performing algorithmic access of global memory stores. The relation of the local structure to tiling is as follows—a tile may be set to be a multiple of the local structure constants so that the number of local structures that fit into a tile determines the unrolling factor of the implicit loop dimensions of the execution structure. This relationship may be seen in the local view decomposition:
_index=_tileIndex*thread_group_dimensions+localIndex
where _tileIndex represents the coordinates of the tile containing _index (i.e., input indexable type 14) and _localIndex is the offset within that tile. The local structure constants thread_group_dimensions may be set to the same as _Tile or set such that a multiple of thread_group_dimensions (e.g., 16) is equal to _Tile to enable coalescing of global memory accesses in a DP optimal compute node. Accordingly, tile communication operator 12 provides a straight-forward, error free, and intuitive tile decomposition for DP optimal compute nodes.

Tile communication operator 12 may be applied recursively and may be combined with other communication operators that operate on indexable types.

The use of tile communication operator 12 will now be illustrated with regard to matrix multiplication.

Without using tile communication operator 12, matrix multiplication may be performed on a global view structure as shown in the following code.

```
__declspec(vector)
void mxm_kernel_naive(index<2> idx,
        field<2, float>& mC,
        read_only_range<field<2, float>>& mA,
        read_only_range<field<2, float>>& mB){
    float c = 0.0f;
    for (int k = 0; k < mA.get_extent(1); k++)
        c += mA(idx(0), k) * mB(k, idx(1));
    mC(i, j) = c;
}
void mxm(float* C, const float* A, const float* B, size_t N) {
    grid<2> g(N, N);
    field<2, float> mA(g), mB(g), mC(g);
    mA.copy_in(A, N*N);
    mB.copy_in(B, N*N);
    forall(mC.get_grid( ), mxm_kernel_naive,
        mC, read_only(mA), read_only(mB));
    mC.copy_out(B, N*N);
}
```

Assume there is a local view structure determined by 16×16 thread group dimensions. Analogously, tile the matrices A, B and C into 16×16 tiles. (Assume for now that N is evenly divisible by 16—the general case checks for boundary conditions and the kernel exits early when a tile is not completely contained in the original data.)

Strip mine the following loop:

```
for (int k = 0; k < mA.get_extent(1); k++)
    c += mA(idx(0), k) * mB(k, idx(1));
``` to yield:

```
for (int k = 0; k < mA.get_extent(1)/16; k++)
    for (int x = 0; x < 16; x++)
        c += mA(idx(0), k*16 + x) * mB(k*16 + x, idx(1));
```

To tile the above, decompose:

idx=_tileIdx*_Tile+_localIdx.

and then combine with tiled_mA and tiled_mB to yield:

```
for (int k = 0; k < tiled_mA.get_extent(1); k++)
    for (int x = 0; x < 16; x++)
        c += tiled_mA(_tileIdx(0), k)(_localIdx(0), x) *
             tiled_mB(k, _tileIdx(1))(x, _localIdx(1));
```

From the above decomposition, it may be seen that:

```
mA(idx(0),k*16 + x)==tiled_mA(_tileIdx(0), k)(_localIdx(0), x);
and
mB(k*16 + x, idx(1))==tiled_mB(k, _tileIdx(1))(x, _localIdx(1)).
```

The correspondence follows from:
idx=_tileIdx*_Tile+_localIdx,
which is to say, every point in the matrix has a unique decomposition into the tile containing the point and the offset within the tile. To complete this example, memory coalescing through shared memory may be performed. Suppose the above global view matrix multiplication forms a kernel that is dispatched with respect to thread group dimensions of 16×16, which means that 256 threads are logically executing the kernel simultaneously. Whenever one thread needs the results of another thread from its own thread group, a synchronization barrier is inserted:
group_barrier( )
which blocks all threads in a thread group until all have reached the barrier.

Consider the memory loads:

```
mA(idx(0), k)
mB(k, idx(1))  // fixed k
```

The thread group has threads (i, j) with $0<=i, j<16$. For any i, the threads:
(i, 0), (i, 1), . . . , (i, 15)
read contiguous 4-byte addresses from global memory in order to have fully coalesced access. In particular, thread (i,0) reads the $1^{st}$ 4-bytes, thread (i, 1) reads the $2^{nd}$ 4-bytes, thread (i, 2) reads the $3^{rd}$ 4-bytes, etc.

Memory is accessed from global memory in 64 or 128 byte chunks, and it is optimal to actually use all memory that is accessed. However:
mA (idx(0), k)
only utilizes 4-bytes for any row of threads ((i, 0), (i, 1), . . . , (i, 15)), so most of the global memory fetch is unused. Whereas: mB(k, idx(1))=mB(k, _tileIdx (1)*16+_localIdx(1)) is fully coalesced for 64 byte chunks, because _localIdx varies exactly as (i, 0), (i, 1), . . . , (i, 15). Similarly, assume the thread group and _Tile group dimensions 8×32, then: mB(k, idx (1))=mB(k, _tileIdx(1)*32+_localIdx(1)) is fully coalesced for 128 byte chunks, because _localIdx varies exactly as (i, 0), (i, 1), . . . , (i, 31).

In order to force all memory accesses to be fully coalesced, the global memory is read into shared memory in a coalesced fashion then, because the coalesced order is not the order which is used to perform the computation, synchronize at a group barrier and thereafter access from shared memory in the desired order. This causes memory accesses to be fully coalesced and a worthwhile optimization because shared memory in a DP optimal compute node has essentially unit access speed. sharedA[_localIdx]=tiled_mA (_tileIdx(0),k)[_localIdx]; and sharedB[_localIdx]=tiled_mB(k, tileIdx(1))[_localIdx];

Putting it all together yields:

```
local_field<float, 16, 16> sharedA, sharedB;
for (int i = 0; i < tiled_mA.get_extent(0); i++) {
    sharedA[_localIdx] = tiled_mA(_tileIdx[0], i)[_localIdx];
    sharedB[_localIdx] = tiled_mB(i, _tileIdx[1])[_localIdx];
    group_barrier( );
    for (int k = 0; k < 16; k++)
        tempC += sharedA(_localIdx[0], k) * sharedB(k, _localIdx[1]);
    group_barrier( );
}
mC(tileIdx)(localIdx) = tempC;
``` or

```
__declspec(vector)
void mxm_kernel_tiling(index_group<2> idx,
                field<2, float> & mC,
                read_only_range<tile_range<2, field<2,
                    float>>>& mA,
                read_only_range<tile_range<2, field<2,
                    float>>>& mB)
{
    float tempC = 0.0f;
    local_field<float, 16, 16> sharedA, sharedB;
    for (int i = 0; i < mA.get_extent(1); i++) {
        sharedA[idx.local( )] = mA(idx.group(0), i)[idx.local( )];
        sharedB[idx.local( )] = mB(i, idx.group(1))[idx.local( )];
        group_barrier( );
        for (int k = 0; k < 16; k++)
            tempC += sharedA(idx.local(0), k) * sharedB(k,
                idx.local(1));
        group_barrier( );
    }
    mC[idx.global( )] = tempC;
}
``` with a call site:

```
void mxm(float* C, const float* A, const float* B, size_t N) {
    grid<2> g(N, N);
    field<2, float> mA(g), mB(g), mC(g);
    extent<2> _Tile(16,16);
    mA.copy_in(A, N*N);
    mB.copy_in(B, N*N);
    forall<16,16>(mC.get_grid( ), mxm_kernel_tiling,
        mC, read_only(tile(mA, _Tile)), read_only(tile(mB, _Tile)));
    mC.copy_out(B, N*N);
}
```

The use of tile communications operator 12 may substantially increase the speed of performing matrix multiplication based on the fully coalesced memory accesses. In addition, the use of tile communications operator 12 may dramatically increase the speed of performing matrix multiplication based on the fully coalesced memory accesses if one of the matrices is transposed as part of the multiplication. In the case A*transpose(B), memory accesses are entirely un-coalesced to yield about a 100 times performance hit without tiling.

FIG. 5 is a block diagram illustrating an embodiment of a computer system 100 configured to compile and execute data parallel code 10 that includes a tile communication operator 12.

Computer system 100 includes a host 101 with one or more processing elements (PEs) 102 housed in one or more processor packages (not shown) and a memory system 104. Computer system 100 also includes zero or more input/output devices 106, zero or more display devices 108, zero or more peripheral devices 110, and zero or more network devices 112. Computer system 100 further includes a compute engine 120 with one or more DP optimal compute nodes 121 where each DP optimal compute node 121 includes a set of one or more processing elements (PEs) 122 and a memory 124 that stores DP executable 138.

Host 101, input/output devices 106, display devices 108, peripheral devices 110, network devices 112, and compute engine 120 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a smart phone, a personal digital assistant (PDA), a mobile telephone, and an audio/video device. The components of computer system 100 (i.e., host 101, input/output devices 106, display devices 108, peripheral devices 110, network devices 112, interconnections 114, and compute engine 120) may be contained in a common housing (not shown) or in any suitable number of separate housings (not shown).

Processing elements 102 each form execution hardware configured to execute instructions (i.e., software) stored in memory system 104. The processing elements 102 in each processor package may have the same or different architectures and/or instruction sets. For example, the processing elements 102 may include any combination of in-order execution elements, superscalar execution elements, and data parallel execution elements (e.g., GPU execution elements). Each processing element 102 is configured to access and execute instructions stored in memory system 104. The instructions may include a basic input output system (BIOS) or firmware (not shown), an operating system (OS) 132, code 10, compiler 134, GP executable 136, and DP executable 138. Each processing element 102 may execute the instructions in conjunction with or in response to information received from input/output devices 106, display devices 108, peripheral devices 110, network devices 112, and/or compute engine 120.

Host 101 boots and executes OS 132. OS 132 includes instructions executable by the processing elements to manage the components of computer system 100 and provide a set of functions that allow programs to access and use the components. In one embodiment, OS 132 is the Windows operating system. In other embodiments, OS 132 is another operating system suitable for use with computer system 100.

When computer system executes compiler 134 to compile code 10, compiler 134 generates one or more executables—e.g., one or more GP executables 136 and one or more DP executables 138. In other embodiments, compiler 134 may generate one or more GP executables 136 to each include one or more DP executables 138 or may generate one or more DP executables 138 without generating any GP executables 136. GP executables 136 and/or DP executables 138 are generated in response to an invocation of compiler 134 with data parallel extensions to compile all or selected portions of code 10. The invocation may be generated by a programmer or other user of computer system 100, other code in computer system 100, or other code in another computer system (not shown), for example.

GP executable 136 represents a program intended for execution on one or more general purpose processing elements 102 (e.g., central processing units (CPUs)). GP executable 136 includes low level instructions from an instruction set of one or more general purpose processing elements 102.

DP executable 138 represents a data parallel program or algorithm (e.g., a shader) that is intended and optimized for execution on one or more data parallel (DP) optimal compute nodes 121. In one embodiment, DP executable 138 includes DP byte code or some other intermediate representation (IL) that is converted to low level instructions from an instruction set of a DP optimal compute node 121 using a device driver (not shown) prior to being executed on the DP optimal compute node 121. In other embodiments, DP executable 138 includes low level instructions from an instruction set of one or more DP optimal compute nodes 121 where the low level instructions were inserted by compiler 134. Accordingly, GP executable 136 is directly executable by one or more general purpose processors (e.g., CPUs), and DP executable 138 is either directly executable by one or more DP optimal compute nodes 121 or executable by one or more DP optimal compute nodes 121 subsequent to being converted to the low level instructions of the DP optimal compute node 121.

Computer system 100 may execute GP executable 136 using one or more processing elements 102, and computer system 100 may execute DP executable 138 using one or more PEs 122 as described in additional detail below.

Memory system 104 includes any suitable type, number, and configuration of volatile or non-volatile storage devices configured to store instructions and data. The storage devices of memory system 104 represent computer readable storage media that store computer-executable instructions (i.e., software) including OS 132, code 10, compiler 134, GP executable 136, and DP executable 138. The instructions are executable by computer system 100 to perform the functions and methods of OS 132, code 10, compiler 134, GP executable 136, and DP executable 138 as described herein. Memory system 104 stores instructions and data received from processing elements 102, input/output devices 106, display devices 108, peripheral devices 110, network devices 112, and compute engine 120. Memory system 104 provides stored instructions and data to processing elements 102, input/output devices 106, display devices 108, peripheral devices 110, network devices 112, and compute engine 120. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Compute engine 120 is configured to execute DP executable 138. Compute engine 120 includes one or more compute nodes 121. Each compute node 121 is a collection of computational resources that share a memory hierarchy. Each compute node 121 includes a set of one or more PEs 122 and a memory 124 that stores DP executable 138. PEs 122 execute DP executable 138 and store the results generated by DP executable 138 in memory 124. In particular, PEs 122 execute DP executable 138 to apply a tile communication operator 12 to an input indexable type 14 to generate an output indexable type 18 as shown in FIG. 5 and described in additional detail above.

A compute node 121 that has one or more computational resources with a hardware architecture that is optimized for data parallel computing (i.e., the execution of DP programs or algorithms) is referred to as a DP optimal compute node 121. Examples of a DP optimal compute node 121 include a node 121 where the set of PEs 122 includes one or more GPUs and a node 121 where the set of PEs 122 includes the set of SIMD units in a general purpose processor package. A compute node 121 that does not have any computational resources with a hardware architecture that is optimized for data parallel computing (e.g., processor packages with only general purpose processing elements 102) is referred to as a non-DP optimal compute node 121. In each compute node 121, memory 124 may be separate from memory system 104 (e.g., GPU memory used by a GPU) or a part of memory system 104 (e.g., memory used by SIMD units in a general purpose processor package).

Host 101 forms a host compute node that is configured to provide DP executable 138 to a compute node 121 for execution and receive results generated by DP executable 138 using interconnections 114. The host compute node includes is a collection of general purpose computational resources (i.e., general purpose processing elements 102) that share a memory hierarchy (i.e., memory system 104). The host compute node may be configured with a symmetric multiprocessing architecture (SMP) and may also be configured to maximize memory locality of memory system 104 using a non-uniform memory access (NUMA) architecture, for example.

OS 132 of the host compute node is configured to execute a DP call site to cause a DP executable 138 to be executed by a DP optimal or non-DP optimal compute node 121. In embodiments where memory 124 is separate from memory system 104, the host compute node causes DP executable 138 and one or more indexable types 14 to be copied from memory system 104 to memory 124. In embodiments where memory system 104 includes memory 124, the host compute node may designate a copy of DP executable 138 and/or one or more indexable types 14 in memory system 104 as memory 124 and/or may copy DP executable 138 and/or one or more indexable types 14 from one part of memory system 104 into another part of memory system 104 that forms memory 124. The copying process between compute node 121 and the host compute node may be a synchronization point unless designated as asynchronous.

The host compute node and each compute node 121 may concurrently execute code independently of one another. The host compute node and each compute node 121 may interact at synchronization points to coordinate node computations.

In one embodiment, compute engine 120 represents a graphics card where one or more graphics processing units (GPUs) include PEs 122 and a memory 124 that is separate from memory system 104. In this embodiment, a driver of the graphics card (not shown) may convert byte code or some other intermediate representation (IL) of DP executable 138 into the instruction set of the GPUs for execution by the PEs 122 of the GPUs.

In another embodiment, compute engine 120 is formed from the combination of one or more GPUs (i.e. PEs 122) that are included in processor packages with one or more general purpose processing elements 102 and a portion of memory system 104 that includes memory 124. In this embodiment, additional software may be provided on computer system 100 to convert byte code or some other intermediate representation (IL) of DP executable 138 into the instruction set of the GPUs in the processor packages.

In further embodiment, compute engine 120 is formed from the combination of one or more SIMD units in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the SIMD units in the processor packages.

In yet another embodiment, compute engine 120 is formed from the combination of one or more scalar or vector processing pipelines in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the scalar processing pipelines in the processor packages.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable memory storing computer-executable instructions that, when compiled and executed by a computer system, perform a method comprising:
   generating an output indexable type from an input indexable type in response to a tile communication operator in data parallel source code configured for execution on one or more data parallel optimal compute nodes having a special purpose architecture, the data parallel source code including data parallel features that take advantage of the special purpose architecture of the one or more data parallel optimal compute nodes to allow data parallel operations to be executed faster or more efficiently than with general purpose processors, the input indexable type defines a computational space of a data parallel algorithm and has a rank and at least one of a first element type and a first shape, the output indexable type has the rank and at least one of a second element type that is a tile of the input indexable type and a second shape that is a tile of the input indexable type; and
   performing the data parallel algorithm including a matrix operation using the output indexable type in which the output indexable type provides a local view structure of the computational space of the data parallel algorithm to enable coalescing of global memory accesses in the one or more data parallel optimal compute nodes.

2. The computer readable memory of claim 1, wherein the input indexable type has the first element type, and wherein the output indexable type has the second element type that is a tile of the input indexable type.

3. The computer readable memory of claim 1, wherein the input indexable type has the first shape, and wherein the output indexable type has the second shape that is a tile of the input indexable type.

4. The computer readable memory of claim 1, wherein the output indexable type maps to an execution structure of the one or more data parallel optimal compute nodes.

5. The computer readable memory of claim 1, wherein the data parallel source code is written in a high level general purpose programming language with data parallel extensions.

6. The computer readable memory of claim 1, wherein the data parallel source code is written in a high level data parallel programming language.

7. The computer readable memory of claim 1, wherein the one or more data parallel optimal compute nodes include at least one graphics processing unit.

8. The computer readable memory of claim 1, wherein the one or more data parallel optimal compute nodes include at least one general purpose processor.

9. A method performed by a compiler in a computer system, the method comprising:
   identifying a tile communication operator in data parallel source code configured for execution on one or more data parallel optimal compute nodes having a special purpose architecture, the data parallel source code including data parallel features that take advantage of the special purpose architecture of the one or more data parallel optimal compute nodes to allow data parallel operations to be executed faster or more efficiently than with general purpose processors; and
   generating data parallel executable code from the data parallel source code such that the data parallel executable code implements tile communication operator by decomposing an input indexable type into an output indexable type for a matrix operation, the input indexable type defines a computational space of the data parallel executable code and has a rank and at least one of a first element type and a first shape, the output indexable type provides a local view structure of the computational space of the data parallel executable code to enable coalescing of global memory accesses in the one or more data parallel optimal compute nodes and has the rank and at least one of a second element type that is a tile of the input indexable type and a second shape that is a tile of the input indexable type.

10. The method of claim 9 wherein the input indexable type has the first element type, and wherein the output indexable type has the second element type that is a tile of the input indexable type.

11. The method of claim 9, wherein the input indexable type has the first shape, and wherein the output indexable type has the second shape that is a tile of the input indexable type.

12. The method of claim 9 wherein the output indexable type maps to an execution structure of the one or more data parallel optimal compute nodes.

13. The method of claim 9 wherein the data parallel source code is written in a high level general purpose programming language with data parallel extensions.

14. The method of claim 9 wherein the data parallel source code is written in a high level data parallel programming language.

15. The method of claim 9 wherein the one or more data parallel optimal compute nodes include at least one graphics processing unit.

16. The method of claim 9 wherein the one or more data parallel optimal compute nodes include at least one general purpose processor.

17. A computer readable memory storing computer-executable instructions that, when executed by a computer system, perform a method comprising:
   applying a tile communication operator to decompose an input indexable type with a rank and a first element type into an output indexable type with the rank and a second element type that is a tile of the input indexable type;

defining, with the input indexable type, a computational space of a data parallel algorithm; and performing the data parallel algorithm on the input indexable type using the output indexable type in a matrix operation in which the output indexable type provides a local view structure of the computational space of the data parallel algorithm to enable coalescing of global memory accesses in one or more data parallel optimal compute nodes;

wherein the tile communications operator is included in data parallel source code written in a high level general purpose programming language with data parallel extensions, wherein the output indexable type maps to an execution structure of the one or more data parallel optimal compute nodes configured to perform the data parallel algorithm with a special purpose architecture, the data parallel extensions including data parallel features that take advantage of the special purpose architecture of the one or more data parallel optimal compute nodes to allow data parallel operations to be executed faster or more efficiently than with general purpose processors, and wherein the one or more data parallel optimal compute nodes include at least one graphics processing unit.

18. The computer readable memory of claim 17, wherein the first element type has a first shape, and wherein the second element type has a second shape that is the tile.

\* \* \* \* \*